United States Patent [19]

Kapp

[11] 3,917,823

[45] Nov. 4, 1975

[54] PESTICIDE COMPRISING ALUMINUM PHOSPHIDE

[75] Inventor: Wolfgang Kapp, Offenbach, Germany

[73] Assignee: Deutsche Gesellschaft fur Schadlings-bekampfung mbH, Frankfurt, Germany

[22] Filed: July 15, 1974

[21] Appl. No.: 488,596

[52] U.S. Cl. ................................. 424/128; 424/127
[51] Int. Cl.² ......................................... A01N 11/00
[58] Field of Search ............................ 424/128, 127

[56] References Cited
UNITED STATES PATENTS 2,826,486  3/1958  Huter ............................. 424/128 X
2,826,527  3/1958  Huter ............................. 424/128
3,132,067  5/1964  Rauscher et al. ............... 424/128 X
3,372,088  3/1968  Freyberg et al. ................ 424/128

OTHER PUBLICATIONS

Meruo Index, 8th Ed., p. 963 (1968).

*Primary Examiner*—Leonard Schenkman
*Attorney, Agent, or Firm*—Browne, Beveridge, DeGrandi & Kline

[57] ABSTRACT

An improved pesticide comprises aluminum phosphide, a dry alkali metal oxide, a dry alkali metal hydroxide or mixtures of the alkali metal oxides and/or alkali metal hydroxides.

18 Claims, No Drawings

PESTICIDE COMPRISING ALUMINUM PHOSPHIDE

This invention relates to a pesticide comprising aluminum phosphide and other additives.

It is known in the art that phosphine has a highly toxic effect on pests, such as small rodents and insects. Aluminum phosphide develops phosphine ($PH_3$) when contacted with atmospheric moisture, and therefore, has proven itself as a valuable pesticide. A particular advantage of pest control with phosphine developed from aluminum phosphide stems from the fact that it can be used to treat materials intended for human or animal consumption, such as grain, without poisonous residues remaining on the materials after carrying out the phosphine treatment, removing the residue of the pesticide, and vigorous, thorough airing of the treated material.

Aluminum phosphide for phosphine generation can be formulated for the special conditions encountered in the control of pests by means of additives and/or enveloping substances.

Thus, German Pat. No. 1,122,762 discloses the use of a thermally decomposable substance with a pesticide containing aluminum phosphide and the use of an envelope comprising a water-repellent, solid, organic substance. Typical of such a pesticide is one comprising 70% aluminum phosphide, 4% hard paraffin and 26% ammonium carbamate.

German application No. 1,155,631, open to public inspection, teaches among other things that the starting speed of the phosphide can be controlled by adding a readily volatile, solid, organic substance, such as p-dichlorobenzol, naphthalene, camphor, hexachloroethane or paraformaldehyde to the aluminum phosphide.

In German Pat. No. 1,143,053, provision has been made to "hydrophobe" the aluminum phosphide in phosphine-releasing pesticides by the addition of metal soaps, such as zinc, calcium, magnesium or aluminum stearate. Furthermore, strongly hygroscopic substances, such as aluminum chloride, calcium chloride, magnesium chloride or calcium oxide can be added to metal phosphides which gas out undesirably quickly in order to reduce the gassing out or decomposition rate. Toward the end of the gassing out phase, the hygroscopic substances accelerate the pace of gassing out.

All of these additives, however, have not eliminated a disadvantage characteristic of aluminum phosphide when used as a phosphine-releasing substance in a pesticide. The hydrolysis of aluminum phosphide does not result in the complete conversion of the available phosphide under the conditions customary in pest control. The residue from an aluminum phosphide-containing pesticide, even under optimum conditions of use, still contains noticeable portions of unreacted aluminum phosphide, for example, 4 to 8% of the aluminum phosphide initially present. These unconverted portions cause particular difficulties in the disposal of residues from pesticides.

The disposal of this residue has been accomplished hitherto by burning or burying. These processes, however, are not entirely satisfactory because of the dangers associated with them. For example, burying of the residue has been prohibited in some countries for reasons of safety. According to a more recent proposal, disposal of the residue resulting after gassing out is accomplished by introduction of the residue in liquid water. If no special measures are taken, however, phosphine liberated from the residual aluminum phosphide may dissolve in water, and a toxic solution will be formed. The disposal of such a toxic solution creates new problems.

Accordingly, there exists a need in the art for an aluminum phosphide-containing pesticide which will be capable of a more complete utilization of the aluminum phosphide, and the easier disposal of the residue obtained after substantially complete decomposition or gassing out.

Accordingly, this invention provides an improved pesticide containing aluminum phosphide. The improvement comprises including in the pesticide at least one dry, alkali metal oxide, at least one dry, alkali metal hydroxide or a mixture of dry alkali metal oxides and/or hydroxides.

The present invention is based on the surprising observation that the hydrolysis of aluminum phosphide proceeds more easily under the conditions used in pest control whenever a suitable dry, alkali metal oxide or alkali metal hydroxide is added to the aluminum phosphide-containing pesticide. Typical of the oxides suitable for this purpose are lithium oxide, sodium oxide, sodium hydroxide and potassium hydroxide. The use of the hydroxides of rubidium and cesium is considered only in special cases, since these preparations are of higher cost. The particularly preferred pesticides of this invention contain sodium oxide, sodium hydroxide or potassium hydroxide, in addition to the aluminum phosphide and other optional additives.

According to this invention, provision is made for the addition of a dry, alkali metal oxide or hydroxide to the aluminum phosphide. As used herein, a "dry" alkali metal oxide or hydroxide is one which does not release water to aluminum phosphide when in contact with the aluminum phosphide. Thus, it will be understood that a small water content in the alkali metal oxide or hydroxide can be tolerated provided that the water content will not result in hydrolysis of the aluminum phosphide. It is not necessary to use pure alkali metal oxides or pure alkali metal hydroxides. Mixtures of the oxides and hydroxides can be employed. Thus, one can use a mixture of sodium oxide and sodium hydroxide, or a sodium oxide which has been partially converted to sodium hydroxide by the absorption of a small quantity of water. Dry, alkali metal oxides and hydroxides suitable for use in pest control according to this invention are well known in the art, and can be obtained commercially in the required quantities.

The particle size of the alkali metal oxide or alkali metal hydroxide has an influence on the effect of these compounds on an aluminum phosphide which is hydrolyzed upon contact with atmospheric moisture. Typically, the oxide and hydroxide will have a particle size between about 0.001 and about 0.5 mm. A particle size of about 0.025 and about 0.25 mm is particularly preferred. It has been observed that alkali metal oxides or hydroxides having particle sizes above about 0.5 mm cannot be mixed or molded to the desired extent with aluminum phosphide, while the grinding of these oxides or hydroxides to particle sizes below about 0.001 mm increases the costs of these substances without having any substantial increased influence on the hydrolysis of the aluminum phosphide.

The pesticides of this invention contain at least about 10% by weight of the alkali metal oxides, hydroxides or mixtures thereof, related to the weight of the aluminum phosphide. The amount of the alkali metal oxides, hydroxides and mixtures thereof should not exceed about 50% by weight. The optimum quantity of the alkali metal oxide depends upon the physical form of the pesticide. According to this invention, about 10 to about 40% by weight of alkali metal oxide, hydroxide or mixtures thereof, related to the weight of aluminum phosphide, are added to a pesticide which is to be in the form of a molded object, such as a diameter of about 8 to about 24 mm and a height between about 4 and about 16 mm. The addition of about 20 to about 35% by weight is particularly preferred in such molded objects. If on the other hand, the pesticide is in granular form, then greater additions of the alkali metal compounds are effective. Thus, about 25 to about 50% by weight of alkali metal oxide, hydroxide or mixtures thereof, can be employed in a pesticide which is in granular form. Preferably, the proportion of alkali metal compounds is about 30 to about 45% by weight, related to the weight of aluminum phosphide.

As previously explained, the addition of dry, alkali metal oxides or alkali metal hydroxides to an aluminum phosphide-containing pesticide results in a continued hydrolysis of the aluminum phosphide present; that is, there will be less unconverted aluminum phosphide in a residue obtained from a pesticide containing alkali metal oxides or hydroxides in accordance with the teachings of this invention than there will be with a pesticide free of such alkali metal oxides or hydroxides, when each is subjected to the customary conditions which exist in pest control. While residues obtained under the customary conditions using an aluminum phosphide-containing pesticide of the prior art still contain at least 4 to 8% of the original aluminum phosphide, the residues obtained from the improved pesticides of this invention contain only about 0.8 to 2.4% of the original aluminum phosphide. Without being bound by the following explanation, it is assumed that the alkali metal oxide or hydroxide employed according to this invention acts on the envelope of aluminum hydroxide, which develops on the surface of an aluminum phosphide grain during the gradual hydrolysis, and opens the aluminum hydroxide envelope at least to the extent that a continued hydrolysis of the aluminum phosphide grain can take place. There are clues to the fact that the layer of aluminum hydroxide formed, which impedes the access of atmospheric moisture, decomposes at least partially with the formation of an aluminate, and/or is made more easily permeable by atmospheric moisture because of the highly basic action of the alkali metal oxides or hydroxides.

At the same time, it is completely surprising that the hydrolysis of the aluminum phosphide is not slowed by the hygroscopic alkali metal oxides or hydroxides competing for the available atmospheric moisture. For example, a known aluminum phosphide-containing pesticide ("Phostoxin"...molded object) and a pesticide prepared according to this invention (molded object of "Phostoxin" with the addition of 26% by weight of sodium oxide, related to the weight of the aluminum phosphide) were each exposed in a closed system under the same conditions [each time five molded bodies (weight each 0.6g) at 20°C in a 20 l Exsiccator under 55% relative atmospheric humidity] to the action of atmospheric moisture. The following time-dependent phosphine development was observed:

TABLE A

| Time (Min's) | Phosphine Development From $Na_2O$-containing molded articles | From molded articles free of $Na_2O$ |
|---|---|---|
| 40 | 97 ppm | 102 ppm |
| 60 | 143 ppm | 135 ppm |
| 80 | 148 ppm | 150 ppm |
| 120 | 195 ppm | 190 ppm |

Thus, when sodium oxide-containing preparations are compared with preparations free of sodium oxide, there is no significant difference in phosphine development within the measurement accuracy of about ±5 ppm within the stated measuring time.

Persons skilled in the art will recognize that the extended hydrolysis of the aluminum phosphide-containing pesticide achieved according to this invention results in a larger quantity of phosphine being developed, and an improved utilization of the aluminum phosphide. It will also be recognized that the extended hydrolysis simplifies the problem of disposing of the pesticide residue since the residues from pesticides of this invention have a smaller content of aluminum phosphide. In most cases, the residues obtained after gassing out of the phosphine contain less than 1.5% of the original aluminum phosphide. Also, the alkali metal oxide or alkali metal hydroxide has been converted into alkali metal carbonates so that no special measures are required for disposal of the residue.

Nevertheless, if it is desired to provide special methods for the disposal of residues resulting from pest control using aluminum phosphide-containing agents of this invention, then the residues can be disposed of by introducing them into liquid water in accordance with a recent proposal. The phosphine that might result thereby is oxidized into unobjectionable products by additives having an oxidizing action. Since the residue from the pesticide according to this invention contains a smaller quantity of unreacted aluminum phosphide, the quantity of oxidant can be reduced accordingly. While the treatment of a residue from a pesticide of this invention may result in an aqueous solution having an alkaline character because of the alkali metal oxide or hydroxide, this is generally unobjectionable since the hydroxide reacts with carbon dioxide in the air to form carbonates. It was observed during disposal that the residues obtained from aluminum phosphide-containing pesticides are only wetted slowly by water and submerged in water. Wetting is delayed for a particularly long time in the case of preparations which contain water-repellent, envelope substances.

This invention also provides for the addition of a detergent to aluminum phosphide-containing pesticides in order to accelerate the moistening and submerging of pesticide residues in liquid water. The detergent insures a more rapid elimination of the pesticide residue.

The submersion of residues in liquid water is accelerated by small additions of detergents. Additions of about 0 to about 10% by weight of detergent, preferably about 0.5 to about 8.5% by weight, related to the proportion of aluminum phosphide, can be employed.

In order to insure the effectiveness of the detergent even after a prolonged storage period, detergents which neither react with the aluminum phosphide nor with the strongly basic alkali metal oxide or hydroxide are employed. Suitable detergents are the anion-active surfactants, such as alkyl sulfonates, alkyl sulfates, alkylaryl sulfonates, alkali metal salts of fatty acids and similar surfactants. Particularly preferred are the alkylaryl sulfonates, such as the sodium salts of tetradecylbenzene sulfonic acid, dodecylbenzene sulfonic acid, diisopropylnaphtalene and diisobutylnaphtalene sulfonic acids. These detergents are available as commercial products.

The improved pesticides of this invention contain aluminum phosphide as a phosphine-releasing metal phosphide. As a general rule, the aluminum phosphide is produced by reacting metallic aluminum with red phosphorus. Aluminum phosphide is commercially obtainable. It is not necessary that chemically pure aluminum phosphide be used in the pesticide of this invention. Technical grade aluminum phosphide is also well suited. Such an aluminum phosphide customarily contains from about 10 to about 20% by weight aluminum oxide and possibly other impurities depending upon the method of production. The impurities in technical grade aluminum phosphides are designated hereinafter as inert material.

If desired, the pesticide of this invention can contain other phosphine-releasing metal phosphides, such as calcium phosphide or magnesium phosphide.

In another embodiment of this invention, it has been observed that the addition of dry, alkali metal oxides or hydroxides to aluminum phosphide-containing pesticides leads to a further hydrolysis of the aluminum phosphide even if the pesticide contains other components. Typical of such other components are substances which form a protective envelope around the phosphide particles in order to control the admission of moisture. Paraffin, metal stearates or polyethylene oxide are examples of suitable substances for forming the protective envelope. Typical of other components which can be employed are inert diluents (silicon dioxide, aluminum oxide, burned claymeal); substances which develop a gas at a moderately elevated temperature (ammonium carbonate, ammonium bicarbonate, sodium bicarbonate, ammonium carbamate); molding aides (talcum) and other additives.

A preferred aluminum phosphide-containing pesticide for use in this invention is known by the tradename "Phostoxin" (produced and distributed by DEGESCH, Frankfurt, Germany). It consists essentially of 70% technical grade aluminum phosphide, 4% hard paraffin and 26% ammonium carbamate. The hard paraffin forms a protective coating around the phosphide and carbamate, and controls the access to atmospheric moisture. When an alkali metal oxide or hydroxide is added according to this invention to this pesticide, it has been observed that the hydrolysis of the aluminum phosphide is extended, as a result of which the aluminum phosphide is more efficiently utilized and the residues obtained can be disposed of more easily.

If, in addition, a detergent is added to the mixture of Phostoxin and alkali metal oxide or hydroxide, then the pesticide residue will be more quickly wetted by liquid water and will more quickly submerge in it, so that the disposal of the residues is accelerated.

The pesticide of this invention can be prepared by mixing the finely divided components together in the absence of atmospheric humidity. Mixing can be conducted in conventional apparatus, such as a ball mill or drum mixer. Pressurization and/or heat treatment can follow the actual mixing of the components in order to insure that the enveloping substances which may be present sheath all the particles. The pesticide of this invention can be employed as a freely flowing powder, as a coarser granulate having a particle size of about 0.8 to about 6 mm or in the form of pressed objects; such pressed objects preferably have a height of about 4 to about 16 mm and a diameter of about 8 to about 24 mm.

The following table (Table B) shows the composition of pesticides within the scope of this invention. Each composition was tested to determine the residual content of aluminum phosphide after gassing out of phosphine. Compositions A to E are included in the Table for purposes of comparison. The residues from pesticides 7 to 11 (each having a detergent added thereto) were wetted within 100 seconds upon insertion in running water and submerged quickly, while the residues from the other preparations had not submerged completely within 8 minutes.

Pesticides of this invention listed in Table B were prepared according to the following procedure.

57 parts by weight of powdery, technical grade aluminum phosphide (particle size 3 to 180 $\mu$ m) with a portion of 10 to 20% of inert components conditional on production (essentially $Al_2O_3$) are heated with 3 parts hard paraffin to 150°C in the absence of atmospheric moisture. At the same time, both components are mixed intimately by mechanical stirring. After cooling, a powder comprising phosphide particles capable of flowing and coated with a protective envelope of hard paraffin is obtained. 15 parts by weight of a dry powdery sodium oxide (particle size about 180 $\mu$ m), 23 parts ammonium carbamate and possibly 2 parts of a surfactant (preferably the sodium salt of tetradecylbenzene sulfonic acid) are added to these coated phosphide particles, and all components are mixed homogenously in a closed drum mixer for about 1 minute. The homogenous mixture obtained is subsequently fed to a tabletting press, and is molded into tablets having a height of about 7 mm and a diameter of about 9 mm.

The molded objects are spread out for 120 hours in a conditioning chamber maintained at 20°C and a relative humidity of air of 75% for the purpose of a laboratory determination of the aluminum phosphide still present in the molded objects after gassing out. After completion of the gassing out, the unconverted aluminum phosphide still present in the residues is determined essentially according to the teachings of White and Bushey in *J. Am. Chem. Soc.* 66, 1666 (1944). The results are listed in Table B.

TABLE B

Summary of Aluminum Phosphide Containing Pesticides
(Data in % by weight of the total weight of the molded objects and residual content of aluminum phosphide in the residues after gassing out; data in % of the AlP originally present)

| No: | Aluminum phosphide % by weight | Alkali oxide or hydroxide % by Weight | Detergent: sodium salt of tetradecylbenzene sulfonic acid % by weight | Other components % by weight | Residual content of AlP after 120 hrs. gassing out % |
|---|---|---|---|---|---|
| 1 | 74 | 10 $Na_2O$ | — | balance inert mat. | 2.4 |
| 2 | 70 | 15 $Na_2O$ | — | balance inert mat. | 1.4 |
| 3 | 67 | 18 $Na_2O$ | — | balance inert mat. | 0.8 |
| 4 | 68 | 17 NaOH | — | 3 Paraffin balance inert mat. | 1.9 |
| 5 | 66 | 20 KOH | — | balance inert mat. | 2.1 |
| 6 | 70 | 15 $Li_2O$ | — | balance inert mat. | 2.2 |
| 7 | 66 | 15 $Na_2O$ | 2 | 3 Paraffin balance inert mat. | 1.36 |
| 8 | 64 | 15 $Na_2O$ | 4 | 3 Paraffin balance inert mat. | 1.25 |
| 9 | 49 | 15 $Na_2O$ | 2 | 22 ammonium carbamate balance inert mat. | 0.86 |
| 10 | 46 | 15 $Na_2O$ | 2 | 26 ammonium carbamate balance inert mat. | 0.92 |
| 11 | 47 | 15 $Na_2O$ | 2 | 3 Paraffin, 27 ammonium carbamate balance inert mat. | 1.10 |
| A | 82 | — | — | balance inert mat. | 4.8 |
| B | 80 | — | — | 3 Paraffin balance inert mat. | 5.2 |
| C | 61 | — | — | 26 ammonium carbamate balance inert mat. | 4.5 |
| D | 68 | — | — | 3 Paraffin, 15 calcium oxide, balance inert mat. | 4.6 |
| E | 68 | — | — | 3 Paraffin, 15 phosphorus pentoxide balance inert mat. | 4.3 |

A glance at Table B shows that it is not the hygroscopic nature of the additives which result in the extended hydrolysis of the aluminum phosphide. For example, the residue from pesticide No. 4 [68% by weight aluminum phosphide, 17% by weight sodium hydroxide, 3% by weight paraffin, balance inert material (essentially $Al_2O_3$)] after gassing out still contains 1.9% of the original aluminum phosphide, while comparative composition E [68% by weight aluminum phosphide, 15% by weight phosphorus pentoxide, 3% by weight paraffin, balance inert material (essentially $Al_2O_3$)] yields a residue having 4.3% of the original aluminum phosphide. A person skilled in the art will recognize that phosphorus pentoxide is more hygroscopic than sodium hydroxide.

From Table B one can learn furthermore that pesticides which comprise about 7.5 to about 25% by weight of alkali metal oxide or hydroxide, about 0 to about 5% by weight detergent, about 20 to about 28% by weight ammonium carbamate, about 2 to about 4% by weight paraffin, balance aluminum phosphide optionally containing inert material, have less than 1.2% of the original, unconverted aluminum phosphide in their residues after gassing out extending over a period of about 5 days. Such pesticides are well suited for satisfying the aforementioned need in the art. A particularly preferred pesticide of this invention comprises:

about 7.5 to about 25% by weight sodium oxide,
about 0 to about 5% by weight alkylaryl sulfonate,
about 20 to about 28% by weight ammonium carbamate,
about 2 to about 4% by weight paraffin, and
balance — aluminum phosphide optionally containing inert material.

After gassing out of such pesticides, largely unobjectionable residues are obtained, the disposal of which require no special measures, since the aluminum phosphide present originally is substantially completely converted (about 99%), and the carbon dioxide liberated from the ammonium carbamate neutralizes the alkali metal oxide.

What is claimed is:

1. A pesticidal composition comprising the pesticide aluminum phosphide and a compound selected from the group consisting of a dry alkali metal oxide, a dry alkali metal hydroxide and mixtures thereof, said alkali metal oxide or hydroxide comprising about 10 to about 50% by weight of said pesticide.

2. A composition according to claim 1 which is in the form of a compressed object and the alkali metal oxide, hydroxide or mixture thereof comprises about 10 to 35% by weight of said pesticide.

3. A composition according to claim 1 which is in the form of a powder capable of flowing and said alkali metal oxide, hydroxide or mixture thereof comprises about 30 to about 45% by weight of said pesticide.

4. A composition according to claim 1 in which the alkali metal compound has a particle size of about 0.001 to about 0.5 mm.

5. A composition according to claim 1 in which the alkali metal compound has a particle size of about 0.025 to about 0.25 mm.

6. A composition according to claim 1 which also contains a detergent which does not react with either the aluminum phosphide or the alkali metal oxide or hydroxide.

7. A composition according to claim 6 wherein said detergent is an alkyl sulfonate, alkyl sulfate, alkylaryl sulfonate or an alkali metal salt of a fatty acid.

8. A composition according to claim 1 which contains up to about 10% by weight of a detergent which does not react with either the aluminum phosphide or the alkali metal oxide or hydroxide.

9. A composition according to claim 1 which also contains ammonium carbamate and paraffin.

10. A composition according to claim 1 which contains about 0.5 to about 8.5% by weight of a detergent which does not react with either the aluminum phosphide or the alkali metal oxide or hydroxide.

11. A composition according to claim 1 which comprises:
   about 7.5 to about 25% by weight alkali metal oxide or hydroxide,
   about 0 to about 5% by weight of a detergent which does not react with either the aluminum phosphide or the alkali metal oxide or hydroxide,
   about 20 to about 28% by weight ammonium carbamate,
   about 2 to about 4% by weight paraffin, and
   about 70.5 to about 38% by weight aluminum phosphide.

12. A composition according to claim 1 in which said alkali metal oxide is sodium oxide and said alkali metal hydroxide is sodium hydroxide or potassium hydroxide.

13. A composition according to claim 12 which also contains a detergent which does not react with either the aluminum phosphide or the alkali metal oxide or hydroxide.

14. A composition according to claim 13 in which said detergent is an anionic detergent.

15. A composition according to claim 13 in which said detergent is an alkylaryl sulfonate.

16. A composition according to claim 15 in which said detergent is the sodium salt of an acid selected from the group consisting of tetradecylbenzene sulfonic acid, dodecylbenzene sulfonic acid, diisopropylnaphtalene sulfonic acid and diisobutylnaphtalene sulfonic acid.

17. A composition according to claim 16 which also contains ammonium carbamate and paraffin.

18. A composition according to claim 17 which comprises:
   about 7.5 to about 25% by weight sodium oxide,
   about 0 to about 5% by weight of an alkylaryl sulfonate detergent,
   about 20 to about 28% by weight ammonium carbamate,
   about 2 to about 4% by weight paraffin, and
   about 70.5 to about 38% by weight aluminum phosphide.

* * * * *